United States Patent
Hou et al.

(10) Patent No.: US 11,295,740 B2
(45) Date of Patent: Apr. 5, 2022

(54) VOICE SIGNAL RESPONSE METHOD, ELECTRONIC DEVICE, STORAGE MEDIUM AND SYSTEM

(71) Applicant: Beijing Xiaomi Intelligent Technology Co., Ltd., Beijing (CN)

(72) Inventors: Haining Hou, Beijing (CN); Bing Bu, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 188 days.

(21) Appl. No.: 16/699,186

(22) Filed: Nov. 29, 2019

(65) Prior Publication Data
US 2021/0056965 A1  Feb. 25, 2021

(30) Foreign Application Priority Data

Aug. 22, 2019 (CN) .......................... 201910780342.2

(51) Int. Cl.
*G10L 15/22* (2006.01)
*G10L 25/21* (2013.01)
*H04R 1/40* (2006.01)

(52) U.S. Cl.
CPC .............. *G10L 15/22* (2013.01); *G10L 25/21* (2013.01); *H04R 1/406* (2013.01); *G10L 2015/223* (2013.01)

(58) Field of Classification Search
CPC ... G10L 25/21; G10L 2015/223; H04R 1/406; H04R 3/00
See application file for complete search history.

(56) References Cited

U.S. PATENT DOCUMENTS

| | | | | | |
|---|---|---|---|---|---|
| 5,561,737 A | * | 10/1996 | Bowen | ................. | H04R 29/001 |
| | | | | | 704/275 |
| 6,826,284 B1 | * | 11/2004 | Benesty | .................... | G01S 5/22 |
| | | | | | 348/14.08 |

(Continued)

FOREIGN PATENT DOCUMENTS

| | | |
|---|---|---|
| CN | 101242684 A | 8/2008 |
| CN | 102750956 A | 10/2012 |

(Continued)

OTHER PUBLICATIONS

Extended European Search Report in application No. EP 19218255, dated May 28, 2020.

(Continued)

*Primary Examiner* — Mohammad K Islam
(74) *Attorney, Agent, or Firm* — Syncoda LLC; Feng Ma

(57) ABSTRACT

A method for responding to a voice signal includes: receiving a voice signal by the plurality of electronic devices; determining, for each of the electronic devices, a target sound source point associated with the voice signal; determining, for each of the electronic devices, a direct sound energy associated with the voice signal according to the target sound source point; and selecting from the plurality of electronic devices at least one electronic device with a direct sound energy satisfying a predetermined condition, and responding to the voice signal by the at least one electronic device. A sound pickup decision system based on a plurality of electronic devices, can make more accurate, more reasonable, and more targeted response to a user's voice, improving voice interaction experience.

18 Claims, 4 Drawing Sheets

(56) References Cited

U.S. PATENT DOCUMENTS

| | | | |
|---|---|---|---|
| 9,640,197 B1* | 5/2017 | Fukuda | G10L 15/14 |
| 10,374,816 B1 | 8/2019 | Leblang et al. | |
| 10,685,652 B1* | 6/2020 | Cherukuri | G10L 15/22 |
| 10,735,887 B1* | 8/2020 | McElveen | H04S 7/307 |
| 11,082,460 B2* | 8/2021 | Nesta | G06F 3/013 |
| 2009/0055170 A1* | 2/2009 | Nagahama | G10L 15/20 |
| | | | 704/226 |
| 2009/0141907 A1* | 6/2009 | Kim | G10L 21/0208 |
| | | | 381/71.7 |
| 2010/0241426 A1* | 9/2010 | Zhang | H04R 3/005 |
| | | | 704/226 |
| 2010/0296658 A1 | 11/2010 | Ohashi | |
| 2012/0076316 A1* | 3/2012 | Zhu | G01S 3/801 |
| | | | 381/71.11 |
| 2013/0108066 A1* | 5/2013 | Hyun | G01S 3/8083 |
| | | | 381/59 |
| 2018/0190308 A1 | 7/2018 | Lou et al. | |
| 2019/0051289 A1 | 2/2019 | Yoneda et al. | |
| 2019/0108837 A1* | 4/2019 | Christoph | G10L 15/30 |
| 2019/0259381 A1* | 8/2019 | Ebenezer | H04R 3/005 |
| 2019/0342660 A1* | 11/2019 | Janse | G10L 21/0232 |
| 2019/0379992 A1* | 12/2019 | Schmidt | H04R 1/1041 |

FOREIGN PATENT DOCUMENTS

| | | |
|---|---|---|
| CN | 104094613 A | 10/2014 |
| CN | 107004412 | 8/2017 |
| CN | 107491285 | 12/2017 |
| CN | 107689904 A | 2/2018 |
| CN | 107705785 A | 2/2018 |
| CN | 107924681 A | 4/2018 |
| CN | 108206023 A | 6/2018 |
| CN | 108318862 | 7/2018 |
| CN | 108351872 | 7/2018 |
| CN | 109347709 | 2/2019 |
| CN | 109509468 | 3/2019 |
| CN | 109599104 | 4/2019 |
| CN | 109658927 A | 4/2019 |
| CN | 109917663 | 6/2019 |
| CN | 110072177 A | 7/2019 |
| CN | 110085235 A | 8/2019 |
| CN | 110097877 A | 8/2019 |
| CN | 108962263 B | 9/2019 |
| EP | 3379534 A1 | 9/2018 |
| JP | 2013175869 A | 9/2013 |

OTHER PUBLICATIONS

1st Office Action (CNOA1) in CN 201910780342.2 dated Apr. 21, 2021.

Basics of Electroacoustic Technology, Guan Shanqun, 1982-12-31, Posts & Telecom Press.

Creating Sound for Animation, Wang Yuqin, 2015-05-31, Beijing United Publishing Co., Ltd.

* cited by examiner

VOICE SIGNAL RESPONSE METHOD, ELECTRONIC DEVICE, STORAGE MEDIUM AND SYSTEM

CROSS-REFERENCE TO RELATED APPLICATION

This application claims priority to Chinese Patent Application No. 201910780342.2 filed on Aug. 22, 2019, the disclosure of which is hereby incorporated by reference in its entirety.

BACKGROUND

Currently, more and more electronic devices are capable of performing voice interaction with users. Therefore, a user may have a plurality of electronic devices with sound pickup functions at the same time. The sound pickup function of these electronic devices may be achieved by, for example, a distributed microphone array. If these electronic devices can be awakened by the same wake-up word, it might happen that when a user performs voice interaction, all the electronic devices that receive the wake-up word will be woken up at the same time.

SUMMARY

The present disclosure relates to the field of voice interaction, and more specifically to a method for responding to a voice signal by a plurality of electronic devices, an electronic device, a medium and a system.

According to a first aspect of the embodiments of the present disclosure, a method for responding to a voice signal is provided, including:

receiving a voice signal by the plurality of electronic devices;

determining, for each of the electronic devices, a target sound source point associated with the voice signal;

determining, for each of the electronic devices, a direct sound energy associated with the voice signal according to the target sound source point; and selecting at least one electronic device with a direct sound energy satisfying a predetermined condition from the plurality of electronic devices, and responding to the voice signal by the at least one electronic device.

In some embodiments, the determining the target sound source point associated with the voice signal includes:

based on a geometric center of an array of sound acquisition devices included in each of the electronic devices, selecting a plurality of candidate sound source points of the each of the electronic device;

determining a total correlation of each candidate sound source point of the each of the electronic device relative to the voice signal; and determining a candidate sound source point with a largest total correlation as the target sound source point of the electronic device.

In the embodiments, the determining the total correlation of the each candidate sound source point of the each of the electronic device relative to the voice signal includes:

for each candidate sound source point, determining a correlation between every two sound acquisition devices in the array of sound acquisition devices relative to the voice signal at the candidate sound source point; and calculating a sum of correlations determined for the array of sound acquisition devices, as the total correlation of the candidate sound source point.

For the each candidate sound source point, determining the correlation between the every two sound acquisition devices in the array of sound acquisition devices relative to the voice signal at the candidate sound source point includes:

according to positions of the every two sound acquisition devices and a position of the candidate sound source point, determining a delay difference between the two sound acquisition devices respectively relative to the candidate sound source point; and according to the delay difference and a frequency domain representation of the voice signal, determining the correlation between the every two sound acquisition devices on the voice signal at the candidate sound source point.

In some embodiments, the determining the direct sound energy of the electronic device according to the target sound source point includes:

determining a direct sound coefficient and a reverberation coefficient based on the target sound source point;

establishing a direct sound model based on the direct sound coefficient, and establishing a reverberation model based on the reverberation coefficient;

establishing a spatial covariance matrix based on the direct sound model and the reverberation model; and determining the direct sound energy based on the spatial covariance matrix.

In some embodiments, the determining the direct sound energy based on the spatial covariance matrix includes:

determining a sum of the direct sound model and the reverberation model as the spatial covariance matrix;

determining a direct sound power spectrum based on the spatial covariance matrix and a frequency domain representation of the voice signal; and determining the direct sound energy based on the direct sound power spectrum.

In some embodiments, the selecting from the plurality of electronic devices at least one electronic device with the direct sound energy satisfying the predetermined condition includes: from the plurality of electronic devices, selecting at least one electronic device with the largest direct sound energy, or selecting at least one electronic device with a direct sound energy exceeding a predetermined threshold.

According to a second aspect of the embodiments of the present disclosure, a system for responding to a voice signal is provided, including:

a receiving module configured to receive a voice signal through a plurality of electronic devices to;

a first determining module configured to, for each of the electronic devices, determine a target sound source point associated with the voice signal;

a second determining module configured, for each of the electronic devices, determine a direct sound energy associated with the voice signal according to the target sound source point; and a response module configured to select, from the plurality of electronic devices, at least one electronic device with a direct sound energy satisfying a predetermined condition, and respond to the voice signal through the at least one electronic device to.

According to a third aspect of the embodiments of the present disclosure, a method for responding to a voice signal is provided, including:

receiving, by an electronic device, a voice signal;

determining, by the electronic device, a target sound source point associated with the voice signal;

determining, by the electronic device, a direct sound energy associated with the voice signal according to the target sound source point; and responding, by the electronic device, to the voice signal when the direct sound energy satisfies a predetermined condition.

According to a fourth aspect of the embodiments of the present disclosure, an electronic device for responding to a voice signal is provided, including:

a receiving portion configured to receive a voice signal;

a first determining portion configured to determine a target sound source point associated with the voice signal;

a second determining portion configured to determine a direct sound energy associated with the voice signal according to the target sound source point; and a responding portion configured to respond to the voice signal when the direct sound energy satisfies a predetermined condition.

According to a fifth aspect of the embodiments of the present disclosure, an electronic device for responding to a voice signal is provided, including: an array of sound acquisition devices configured to receive a voice signal;

a processor; and a memory configured to store instructions executable by the processor;

wherein the processor is configured to:

cause the electronic device to determine a target sound source point associated with the voice signal;

determine a direct sound energy associated with the voice signal according to the target sound source point; and cause the electronic device to respond to the voice signal when the direct sound energy satisfies a predetermined condition.

According to a sixth aspect of the embodiments of the present disclosure, a non-transitory computer readable storage medium is provided, wherein when instructions in the storage medium are executed by a processor of an electronic device, the electronic device is caused to execute the method for responding to a voice signal. The method includes:

receiving, by an electronic device, a voice signal;

determining a target sound source point associated with the voice signal;

determining a direct sound energy associated with the voice signal according to the target sound source point; and responding, by the electronic device, to the voice signal when the direct sound energy satisfies a predetermined condition.

According to a seventh aspect of the embodiments of the present disclosure, a system for responding to a voice signal is provided, the system including a plurality of electronic devices, and when the plurality of electronic devices simultaneously receive a voice signal, the system executing the method for responding to a voice signal described above.

According to an eighth aspect of the embodiments of the present disclosure, a system for responding to a voice signal is provided, the system including a plurality of electronic devices described above.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the disclosure, and together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with some aspects related to the disclosure as recited in the appended claims.

Figure 1:
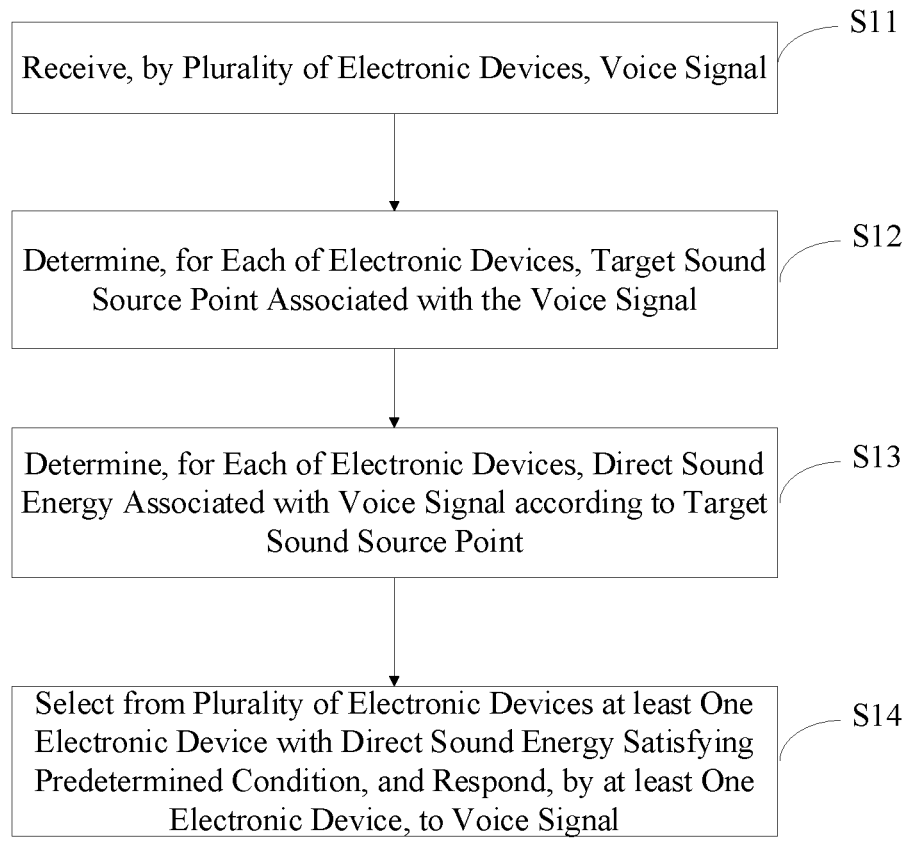
FIG. 1 is a flowchart of a method for responding to a voice signal according to an exemplary embodiment.

FIG. 1 is a flowchart of a method for responding to a voice signal according to an exemplary embodiment. As shown in FIG. 1, the method for responding to a voice signal is applied to a plurality of electronic devices, including the following operations.

In operation S11, a voice signal is received by a plurality of electronic devices.

In operation S12, for each of the electronic devices, a target sound source point associated with the voice signal is determined.

In operation S13, for each of the electronic devices, a direct sound energy associated with the voice signal is determined according to the target sound source point.

In operation S14, at least one electronic device with a direct sound energy satisfying a predetermined condition is selected from the plurality of electronic devices, and the voice signal is responded to by the at least one electronic device.

In embodiments of the present disclosure, the electronic device may be a smart device having a voice interaction function, such as a smart household appliance, a smart home product, a smart wearable device, a smart terminal, or the like. As an example, the smart household appliance may include, for example, a smart washing machine, a smart sweeping robot, a smart air conditioner, a smart television, a smart fan, and the like. The smart home product may include, for example, a smart speaker, a smart alarm clock, a smart desk lamp, and the like. The smart wearable device may include, for example, a smart watch, smart wearable eyeglasses, a smart bracelet, and the like. The smart terminal may include, for example, a smart phone, a smart tablet, and the like. In addition, the electronic device may include an array of sound acquisition devices. The array of sound acquisition devices is a set of a plurality of sound acquisition devices (i.e., more than one sound acquisition device) located at different positions in a space and arranged in a regular shape configuration, which is a means for sampling in a space a voice signal propagated in the space, and the acquired voice signal contains spatial position information. According to a topology of the array of sound acquisition devices, the array may be a one-dimensional array, a two-dimensional planar array, or a three-dimensional array such as a spherical shape. For example, a plurality of sound acquisition devices in the array of sound acquisition devices included in the electronic device may, for example, exhibit a linear arrangement, a circular arrangement, and the like.

In embodiments of the present disclosure, the voice signal is a voice command or a wake-up word sent by the user, and the wake-up word is a specific word or phrase used to wake up the electronic device to answer the user's request.

In embodiments of the present disclosure, at least one electronic device is selected from the plurality of electronic devices according to a predetermined condition. The predetermined condition may be for example, the direct sound energy exceeding a certain threshold, or a largest of the plurality of direct sound energies, or other conditions. In one example, the plurality of electronic devices may simultaneously receive voice commands, and one or more electronic devices are selected to respond to the voice commands based on the received sound energies of the received voice commands. For example, the user's voice command is to adjust a room temperature to 25 degrees. Smart air conditioners or smart fans in different rooms of the user's house simultaneously receive the user's voice command, and each of the smart air conditioners or smart fans calculates the direct sound energy received respectively, determines whether the received direct sound energy is larger than the preset threshold and responds to the user's command if it is larger than the threshold. If the user's voice is relatively large and all the direct sound energies received by the electronic devices exceed the preset threshold, the smart air conditioners and the smart fans in all rooms are turned on, and if the sound is relatively small, only the air conditioner in the same room with the user or closest to the user is turned on. Thereby, a part of electronic devices may be selected more accurately and reasonably to respond to the voice command according to the user's needs.

In another example, when there are a plurality of electronic devices in the same space, there may be a plurality of electronic devices that has been preset with a same wake-up word. When the user says the wake-up word, in order to not cause a phenomenon of multiple responses to a single call, before responding to the user's voice signal, each electronic device calculates the direct sound energy of the voice signal received by itself, then compares the direct sound energy of the voice signal received by itself with the direct sound energies received by other electronic devices. Thus, an electronic device that receives the highest direct sound energy is determined from the plurality of electronic devices to respond to the voice signal. Thereby, it is possible to solve the problem that a plurality of electronic devices having a same wake-up word all respond to a single call during a voice interaction process.

In some embodiments, in operation S12, determining a target sound source point associated with the voice signal includes:

based on a geometric center of an array of sound acquisition devices included in each of the electronic device, selecting a plurality of candidate sound source points of the each of the electronic device;

determining a total correlation of each candidate sound source point of the each of the electronic device relative to the voice signal; and determining a candidate sound source point with a largest total correlation as the target sound source point of the electronic device.

It should be noted that both the candidate sound source point and the target sound source point are virtual points in a space, which do not actually exist, but serve as auxiliary points in voice signal processing. The target sound source point actually represents an orientation closest to a real sound source, which may be understood as an orientation of the target sound source. In addition, locations of the plurality of candidate sound source points may be determined manually. For example, in one possible implementation, the locations of the plurality of candidate sound source points may be randomly determined in different spatial orientations relative to the array of sound acquisition devices. In another possible implementation, the plurality of candidate sound source points may be disposed in a one-dimensional array arrangement, or in a two-dimensional plane arrangement, or in a three-dimensional spatial arrangement, centering on the array of sound acquisition devices.

In some embodiments, the candidate sound source points are selected by establishing a unit spherical surface (for example, with a radius of 1 meter) centered on the center of the array of sound acquisition devices, and taking points with a number of s (s is an integer larger than 2) on the spherical surface. Taking each of the points as the candidate sound source point, a total correlation to the voice signal acquired by the array of sound acquisition devices is calculated. More points the candidate sound source points are taken, more uniform the distribution of the points on the spherical surface will be, and more accurate the finally determined orientation of the target sound source point will be. However, with more points, calculation amount will be larger, and time consuming will be longer. In order not to affect user experience, number of points should be taken considering accuracy and time consuming comprehensively. As an example, 642 points may be taken in a case of uniform discrete sampling.

In some embodiments, when any one of the points with the number of s is taken as the candidate sound source point, determining a total correlation to the voice signal acquired by the array of sound acquisition devices includes:

for each candidate sound source point, determining a correlation between every two sound acquisition devices in the array of sound acquisition devices relative to the voice signal at the candidate sound source point; and calculating a sum of correlations determined for the array of sound acquisition devices, as the total correlation of the candidate sound source point.

The total correlation here is a vector with spatial characteristics. The closer the candidate sound source point is to the real sound source point, the larger the total correlation value will be; hence the candidate point with a largest total correlation may be considered as the target sound source point, which is in an orientation closest to the real sound source. In one example, the total correlation here may be SRP (Steered Response Power).

In some embodiments, determining the correlation between the every two sound acquisition devices in the array of sound acquisition devices on the voice signal at any one candidate sound source point includes: according to positions of the every two sound acquisition devices and a position of the candidate sound source point, determining a delay difference between the every two sound acquisition devices respectively relative to the candidate sound source point; and according to the delay difference and a frequency domain representation of the voice signal, determining the correlation between the every two sound acquisition devices relative to the voice signal at the candidate sound source point.

Generally, sound pickup function of an electronic device is implemented by a distribute array of sound acquisition devices. In some embodiments, to determine a target sound source point of the each of the electronic device, a coordinate system is first established with a geometric center of the array of sound acquisition devices included in the electronic device as an origin. Thereby, coordinates of the plurality of sound acquisition devices in the array of sound acquisition devices may be determined, and coordinates of the plurality of candidate sound source points selected according to the above operations may be determined.

For example, a total of electronic devices with a number of N (N is an integer larger than or equal to 2) receive a voice signal sent by the user, where the array of sound acquisition devices of the r-th (r is an integer, and $1 \leq r \leq N$) electronic device is composed of sound acquisition devices with a number of M (M is an integer larger than or equal to 2). It should be noted that a number of sound acquisition devices included in the each of the electronic device may be different, that is, values of M may be different for different electronic devices.

The following various calculation examples and formulas are described by taking one electronic device as an example, and embodiments for the rest of the electronic devices are similar, details of which will not be repeated herein.

Taking the r-th electronic device as an example, after the coordinate system of the array of sound acquisition devices for the electronic device is established, coordinates of the m-th sound acquisition device are expressed as: $r^m = (r_x^m, r_y^m, r_z^m)$, where m is an integer and $1 \leq m \leq M$. In addition, coordinates of any one candidate sound source point S of the electronic device is expressed as: $(S_x^r, S_y^r, S_z^r)$ where $(S_x^r)^2 + (S_y^r)^2 + (S_z^r)^2 = 1$ establishes.

In an example, before a delay difference between every two sound acquisition devices in the array of sound acquisition devices of the r-th electronic device respectively relative to any one candidate sound source point is determined, a distance difference between the every two sound acquisition devices respectively relative to the candidate sound source point. It is assumed that the every two sound acquisition devices are represented as an i-th sound acquisition device and a k-th sound acquisition device (each of i and k is an integer, and $1 \leq i$, $k \leq M$), and then a distance difference between the i-th sound acquisition device and the k-th sound acquisition device respectively relative to the candidate sound source point S is calculated as:

$$h_{ik} = \sqrt{(S_x^r - r_x^i)^2 + (S_y^r - r_y^i)^2 + (S_z^r - r_z^i)^2} - \sqrt{(S_x^r - r_x^k)^2 + (S_y^r - r_y^k)^2 + (S_z^r - r_z^k)^2}.$$

where $S_x^r, S_y^r, S_z^r$ are coordinates of the sound source point S respectively in three directions of the x-axis, the y-axis, and the z-axis, r is an index of the electronic device, $r_x^i, r_y^i, r_z^i$ are coordinates of the i-th sound acquisition device, and $r_x^k, r_y^k, r_z^k$ are coordinates of the k-th sound acquisition device. The distance difference between the i-th sound acquisition device and the k-th sound acquisition device respectively relative to the candidate sound source point S may be calculated through the above formula.

Based on the above distance difference, the delay difference between the i-th sound acquisition device and k-th sound acquisition device respectively relative to the candidate sound source point S may be determined as:

$$(\tau_S^r)_{ik} = \frac{f_s * h_{ik}}{v},$$

where, $f_s$ is a system sampling rate, and v is the speed of sound.

Then, the correlation is determined according to the delay difference between the i-th sound acquisition device and k-th sound acquisition device respectively relative to the candidate sound source point S through the following formula:

$$R_{ik}^r((\tau_S^r)_{ik}) = \int_{-\infty}^{+\infty} \frac{X_i^r(\omega) X_k^r(\omega)^*}{|X_i^r(\omega) X_k^r(\omega)^*|} e^{j\omega(\tau_S^r)_{ik}} d\omega,$$

where $X_i^r(\omega)$ is a frequency domain signal obtained by performing a time-frequency conversion on a current frame time domain signal $x_i^r(t)$ acquired by the i-th sound acquisition device, $X_k^r(\omega)^*$ is a conjugate of a frequency domain signal obtained by performing a time-frequency conversion on the current frame time domain signal $x_k^r(t)$ acquired by the k-th sound acquisition device. In one example, the time-frequency conversion may be a Short-Time Fourier Transform (STFT). For example, after the voice signal in the time domain is divided into frames and assigned with windows, the current frame is subjected to a STFT conversion.

$R_{ik}^r((\tau_s^r)_{ik})$ is the correlation between the i-th sound acquisition device and the k-th sound acquisition device as one sound acquisition device relative to the acquired voice signal when S is taken as the candidate sound source point.

Correlations between different sound acquisition devices in the array of sound acquisition devices relative to the acquired voice signal collected by the different sound acquisition devices are summed as the total correlation when the point is taken as the candidate sound source point. When there are sound acquisition devices with a number of M, there will be $C_M^2$ pairs of sound acquisition devices, where $C_M^2$ is a combination value. For example, if there are 6 microphones in a smart speaker, there are 15 microphone pairs in combination.

For the electronic device r, correlations of all the sound acquisition devices relative to the acquired voice signal are added together, and the total correlation of all the sound acquisition devices when the S point is taken as the candidate sound source point may be determined as:

$$SRP_S^r = \sum_{i=1}^{M-1} \sum_{k=i+1}^{M} R_{ik}^r((\tau_S^r)_{ik}).$$

Similarly, when a different point is taken as a candidate sound source point, a corresponding total correlation of all sound acquisition devices may be also obtained. In all total correlations of all sound acquisition devices with a number of s when the points with a number of s are respectively taken as candidate sound source points, a point with a largest total correlation is determined as:

$$SRP_{max}^r = \max_S (SRP_S^r).$$

The candidate sound source point with the largest total correlation is the target sound source point to be determined, represented as $S_o^r$ with coordinates $(S_{ox}^r, S_{oy}^r, S_{oz}^r)$.

Then, after the target sound source point of the r-th electronic device is determined, the direct sound energy of the electronic device may be determined according to the target sound source point.

In one embodiment, determining the direct sound energy of the electronic device according to the target sound source point may include: determining a direct sound coefficient and a reverberation coefficient based on the target sound source point; establishing a direct sound model based on the direct sound coefficient, and establishing a reverberation model based on the reverberation coefficient; establishing a spatial covariance matrix based on the direct sound model and the reverberation model; and determining the direct sound energy based on the spatial covariance matrix.

In an example, according to the coordinates $(S_{ox}^r, S_{oy}^r, S_{oz}^r)$ of the target sound source point $S_o^r$ determined previously, the direct sound coefficients of the every two sound acquisition devices (the j-th sound acquisition device and k-th sound acquisition device) relative to the target sound source point may be determined as:

$$d_{ik}^r = \exp\left(j\omega \frac{(r^i - r^k) \cdot S_o^r}{v}\right)$$

where ● denotes a dot product of two vectors, j is an imaginary unit, v is the speed of sound, ω is a frequency of a frequency domain signal of the current frame, and $r^i$ and $r^k$ are coordinates of the i-th sound acquisition device and the k-th sound acquisition device respectively, for example, $r^i = (r_x^i, r_y^i, r_z^i)$ and $r^k = (r_x^k, r_y^k, r_z^k)$. Thus, $(r^i - r^k)$ denotes a distance vector from the i-th sound acquisition device to the k-th sound acquisition device.

Next, a Singer function is used to calculate a reverberation coefficient of the voice signal received by every two sound acquisition devices:

$$q_{ik}^r = \sin c\left(\omega \frac{\|r^i - r^k\|}{v}\right) = \sin\left(\omega \frac{\|r^i - r^k\|}{v}\right) / \left(\omega \frac{\|r^i - r^k\|}{v}\right),$$

where $\|r^i - r^k\| = \sqrt{(r_x^i - r_x^k)^2 + (r_y^i - r_y^k)^2 + (r_z^i - r_z^k)^2}$.

Then, the direct sound model is determined based on the direct sound coefficient $d_i^{kr}$, and the reverberation model is determined based on the reverberation coefficient $q_{ik}^r$. In an example, a direct sound model and a reverb model are:

$$P_D^r(\omega)\begin{bmatrix} 1 & d_{12}^r & \cdots & d_{1M}^r \\ d_{21}^r & 1 & \cdots & d_{2M}^r \\ \vdots & \vdots & \ddots & \vdots \\ d_{M1}^r & d_{M2}^r & \cdots & 1 \end{bmatrix} \text{ and } P_Q^r(\omega)\begin{bmatrix} 1 & q_{12}^r & \cdots & q_{1M}^r \\ q_{21}^r & 1 & \cdots & q_{2M}^r \\ \vdots & \vdots & \ddots & \vdots \\ q_{M1}^r & q_{M2}^r & \cdots & 1 \end{bmatrix}$$

where, $P_D^r(\omega)$ and $P_Q^r(\omega)$ respectively denote a direct sound power spectrum and a reverberation power spectrum of the current frame of the voice signal received by the electronic device r.

Next, a spatial covariance matrix may be established based on the direct sound model and the reverberation model, and then the direct sound energy may be determined based on the spatial covariance matrix.

In some embodiments, the direct sound energy may be determined through the following operations: determining a sum of the direct sound model and the reverberation model as the spatial covariance matrix; determining a direct sound power spectrum based on the spatial covariance matrix and a frequency domain representation of the voice signal; and determining the direct sound energy based on the direct sound power spectrum.

On one hand, after the direct sound model and the reverberation model are determined, the spatial covariance matrix may be established according to the following formula:

$$C^r(\omega) = P_D^r(\omega)\begin{bmatrix} 1 & d_{12}^r & \cdots & d_{1M}^r \\ d_{21}^r & 1 & \cdots & d_{2M}^r \\ \vdots & \vdots & \ddots & \vdots \\ d_{M1}^r & d_{M2}^r & \cdots & 1 \end{bmatrix} + P_Q^r(\omega)\begin{bmatrix} 1 & q_{12}^r & \cdots & q_{1M}^r \\ q_{21}^r & 1 & \cdots & q_{2M}^r \\ \vdots & \vdots & \ddots & \vdots \\ q_{M1}^r & q_{M2}^r & \cdots & 1 \end{bmatrix}.$$

On the other hand, another representation $C^r(\omega) = X^r(\omega) * X^r(\omega)^H$ of the spatial covariance matrix may be obtained based on a frequency domain representation $X^r(\omega)$ of the current frame of the voice signal received by the electronic device r, where the electronic device r includes sound acquisition devices with a number of M, thus $X^r(\omega) = [X_1^r(\omega), X_2^r(\omega), \ldots, X_M^r(\omega)]$ and $X^r(\omega)^H$ is performed conjugate transposition from $X^r(\omega)$.

Therefore, the spatial covariance matrix may be represented either by a direct sound model and a reverberation model, or by a frequency domain signal of the current frame, whereby the following formula may be obtained:

$$C^r(\omega) = X^r(\omega) * X^r(\omega)^H = P_D^r\begin{bmatrix} 1 & \cdots & d_{1M}^r \\ \vdots & \ddots & \vdots \\ d_{M1}^r & \cdots & 1 \end{bmatrix} + P_Q^r\begin{bmatrix} 1 & \cdots & q_{1M}^r \\ \vdots & \ddots & \vdots \\ q_{M1}^r & \cdots & 1 \end{bmatrix}.$$

After being finished, the following formula may be obtained:

$$\underbrace{\begin{bmatrix} 1 & 1 \\ d_{12}^r & q_{12}^r \\ \vdots & \vdots \\ d_{1M}^r & q_{1M}^r \\ d_{21}^r & q_{12}^r \\ 1 & 1 \\ \vdots & \vdots \\ 1 & 1 \end{bmatrix}}_{F^r(\omega)} \underbrace{\begin{bmatrix} P_D^r(\omega) \\ P_Q^r(\omega) \end{bmatrix}}_{P^r(\omega)} = \underbrace{\begin{bmatrix} C_{11}^r(\omega) \\ C_{12}^r(\omega) \\ \vdots \\ C_{1M}^r(\omega) \\ C_{21}^r(\omega) \\ C_{22}^r(\omega) \\ \vdots \\ C_{MM}^r(\omega) \end{bmatrix}}_{\overset{\square}{C^r(\omega)}}$$

with a least-square algorithm, a solution of the above formula is obtained:

$$P^r(\omega) = F^{r+}(\omega)\overset{\square}{C^r}(\omega) = \underbrace{\begin{bmatrix} P_D^r(\omega) \\ P_Q^r(\omega) \end{bmatrix}}_{P^r(\omega)}$$

where $F^{r+}(\omega)$ is a Moore-Penrose pseudo-inverse of $F^r(\omega)$.

In the vector $$\underbrace{\begin{bmatrix} P_D^r(\omega) \\ P_Q^r(\omega) \end{bmatrix}}_{Pr(\omega)},$$

the first element is the direct sound power spectrum $P_D^r(\omega)$, which represents a power of a direct sound at each frequency point, and the second element is the reverberation power spectrum $P_Q^r(\omega)$, which represents a power of a reverberation sound at each frequency point.

Finally, the direct sound powers at all frequency points are added up, to obtain the direct sound energy of the voice signal, that is:

$$P_D^r = \sum_\omega P_D^r(\omega).$$

It should be noted that the example of obtaining a direct sound energy is described in detail above for an electronic device r. A calculation process of a direct sound energy of any other electronic device is similar, which therefore will not be repeated herein. In other words, through the above operations, a plurality of direct sound energies corresponding to the plurality of electronic devices one by one can be respectively obtained.

In some embodiments, selecting, from the determined plurality of direct sound energies, at least one direct sound energy satisfying a predetermined condition includes: from the plurality of electronic devices, selecting a direct sound energy with a highest direct sound energy, or selecting a direct sound energy exceeding a preset threshold.

In embodiments of the present disclosure, a plurality of electronic devices may be regarded as a distributed sound pickup decision system. According to the method for responding herein, at least one electronic device may be determined from the distributed sound pickup decision system to respond to the user's voice command. In an example, selecting an electronic device with a highest direct sound energy from the plurality of electronic devices may be implemented by one designated electronic device of the plurality of electronic devices, and the other electronic devices transmit direct sound energy received by themselves associated with the voice signal to the designated electronic device, then the designated electronic device selects the largest direct sound energy from the direct sound energy received by itself and the direct sound energies received from the other electronic devices, and indicates the electronic device corresponding to the largest direct sound energy to respond. In another example, any two of the plurality of electronic devices may be compared with each other, and an electronic device having a larger direct sound energy is compared with other electronic devices until the largest direct sound energy is determined.

In the method for responding to a voice signal according to embodiments of the present disclosure, by processing a voice signal acquired by a plurality of electronic devices in real time, and determining the direct sound energy of each of the electronic device for the voice signal, it can perform accurate and effective sound pickup decision according to the direct sound energies, to select at least one electronic device satisfying a predetermined condition from the plurality of electronic devices. Thereby, it realizes a sound pickup decision system based on a plurality of electronic devices, which can make more accurate, more reasonable, and more targeted response to the user's voice, improving voice interaction experience.

Figure 2:
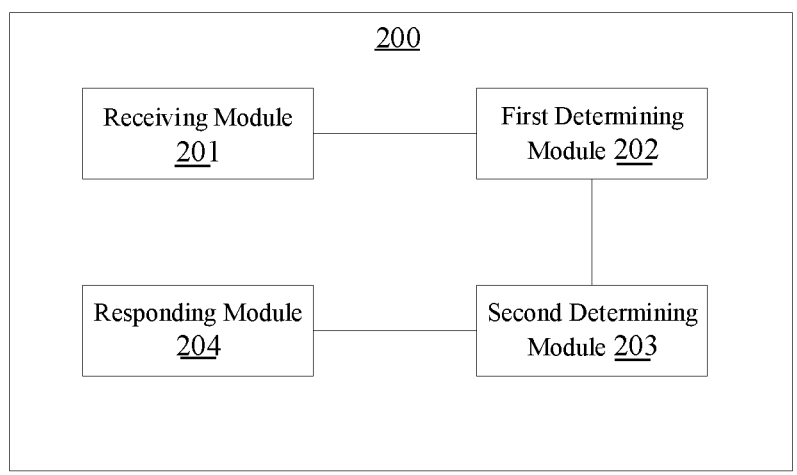
FIG. 2 is a block diagram of a system for responding to a voice signal according to an exemplary embodiment.

FIG. 2 is a block diagram of a system 200 for responding to a voice signal according to an exemplary embodiment. As shown FIG. 2, the system 200 includes:

a receiving module 201 configured to receive a voice signal through a plurality of electronic devices to;

a first determining module 202 configured to, for each of the electronic devices, determine a target sound source point associated with the voice signal;

a second determining module 203 configured to, for each of the electronic devices, determine a direct sound energy associated with the voice signal according to the target sound source point; and a response module 204 configured to select at least one electronic device with a direct sound energy satisfying a predetermined condition from the plurality of electronic devices, and respond to the voice signal through the at least one electronic device.

Specific configurations and operations of the various modules of the system 200 for responding to a voice signal have been described in detail above with reference to the method for responding to a voice signal illustrated in FIG. 1, and will not be repeated herein.

The various device components, circuits, modules, units, blocks, or portions may have modular configurations, or are composed of discrete components, but nonetheless may be referred to as "modules" or "portions" in general. In other words, the "components," "circuits," "modules," "units," "blocks," or "portions" referred to herein may or may not be in modular forms.

Figure 3:
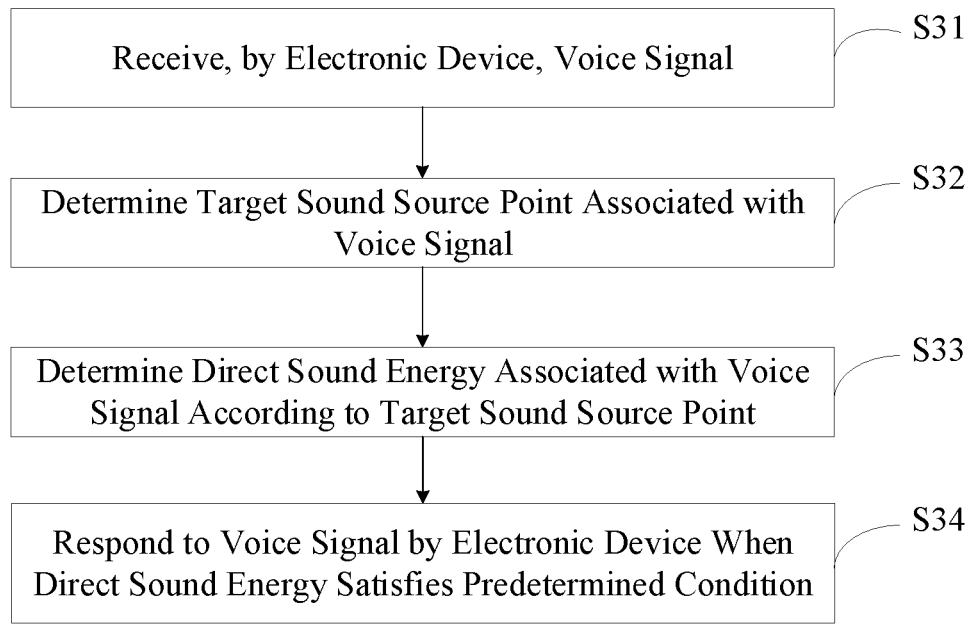
FIG. 3 is a flowchart of a method for responding to a voice signal according to an exemplary embodiment.

FIG. 3 is a flowchart of a method for responding to a voice signal according to an exemplary embodiment, the method for responding to a voice signal being performed by any one electronic device. As shown in FIG. 3, the method for responding to a voice signal includes the following operations.

In operation S31, a voice signal is received by the electronic device.

In operation S32, a target sound source point associated with the voice signal is determined.

In operation S33, a direct sound energy associated with the voice signal is determined according to the target sound source point.

In operation S34, when the direct sound energy satisfies a predetermined condition, the electronic device responds to the voice signal.

Hereof the method for responding to a voice signal performed by a single electronic device is similar to the related configurations and operations in the corresponding operations of the method for responding to a voice signal of the plurality of electronic devices described above with reference to FIG. 1, and will not be repeated here.

Figure 4:
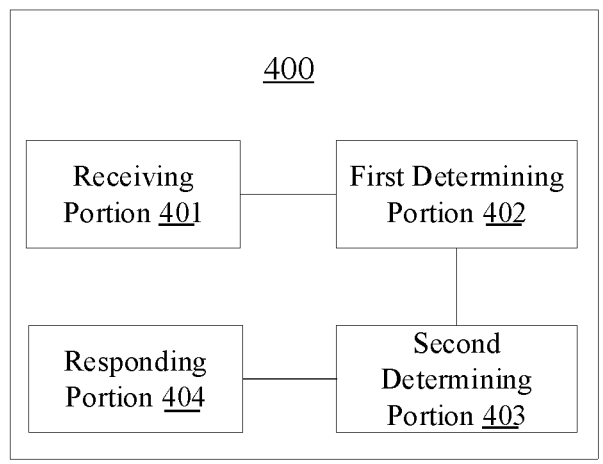
FIG. 4 is a block diagram of an electronic device for responding to a voice signal according to an exemplary embodiment.

FIG. 4 is a block diagram of an electronic device 400 for responding to a voice signal according to an exemplary embodiment. As shown FIG. 4, the electronic device 400 includes: a receiving portion 401, a first determining portion 402, a second determining portion 403 and a responding portion 404.

The receiving portion 401 is configured to cause the electronic device to receive a voice signal.

The first determining portion 402 is configured to determine a target sound source point associated with the voice signal.

The second determining portion 403 is configured to determine a direct sound energy associated with the voice signal according to the target sound source point.

The responding portion 404 is configured to respond to the voice signal when the direct sound energy satisfies a predetermined condition.

Figure 5:
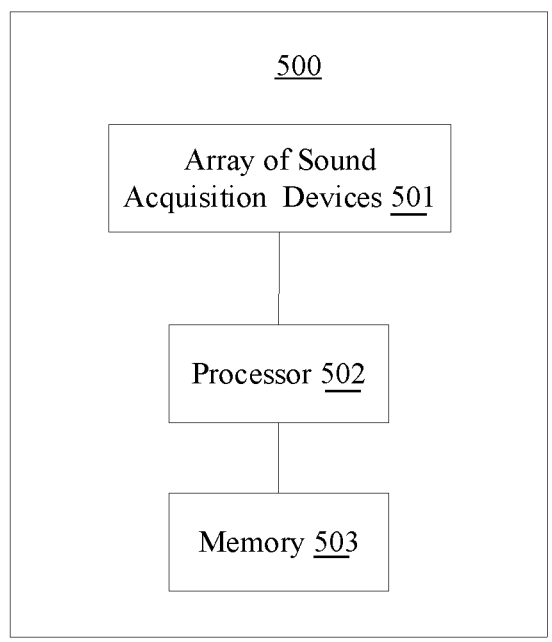
FIG. 5 is a block diagram of an electronic device for responding to a voice signal according to an exemplary embodiment.

FIG. 5 is a block diagram of an electronic device 500 for responding to a voice signal according to an exemplary embodiment. Referring to FIG. 5, the electronic device 500 includes an array 501 of sound acquisition devices, a processor 502 and a memory 503.

The array 501 of sound acquisition devices is configured to receive a voice signal.

The memory 503 is configured to store instructions executable by the processor 502.

The processor 502 is configured to perform the method for responding to a voice signal as shown in FIG. 3.

Figure 6:
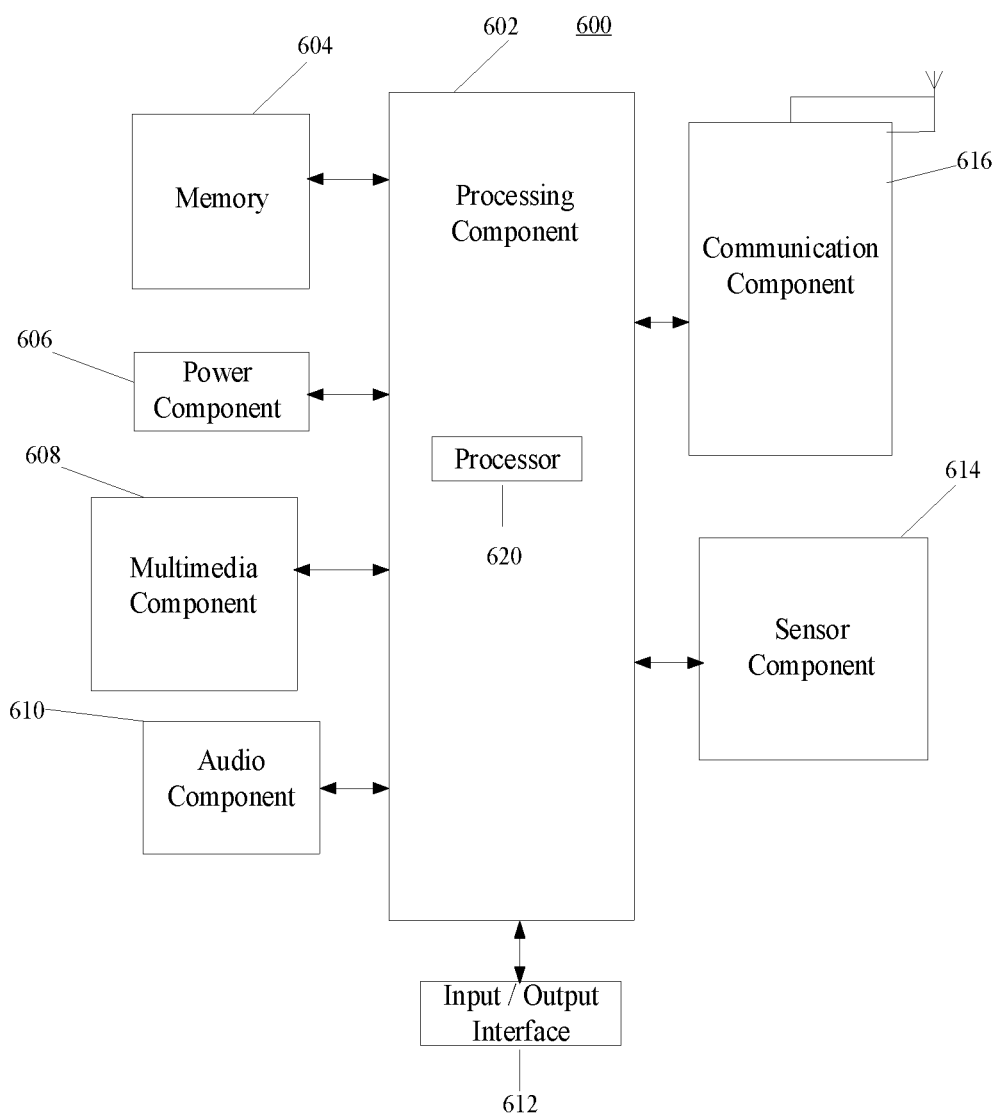
FIG. 6 is a block diagram of an electronic device according to an exemplary embodiment.

FIG. 6 is a block diagram of an electronic device 600 according to an exemplary embodiment. For example, the electronic device 600 may be a mobile phone, a computer, a digital broadcast terminal, a message receiving and sending device, a game console, a tablet device, a medical device, a fitness device, a personal digital assistant, and the like.

Referring to FIG. 6, the electronic device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the electronic device 600, such as operations associated with display, phone call, data communications, camera operations and operations associated with recording operations. The processing component 602 may include one or more processors 620 to execute instructions, to perform all or part of the operations of the above method. Moreover, the processing component 602 may include one or more modules which facilitate interactions between the processing component 602 and other components. For instance, the processing component 602 may include a multimedia module to facilitate an interaction between the multimedia component 608 and the processing component 602.

The memory 604 is configured to store various types of data to support operations on the electronic device 600. Examples of such data include instructions for any applications or methods operated on the electronic device 600, contact data, telephone directory data, messages, pictures, video, etc. The memory 604 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power component 606 provides power to various components of the electronic device 600. The power component 606 may include a power management system, one or more power sources, and any other components associated with generation, management, and distribution of power for the electronic device 600.

The multimedia component 608 includes a screen providing an output interface between the electronic device 600 and the user. In some embodiments, the screen may include a Liquid Crystal Display (LCD) and a Touch Panel (TP). In some embodiments, an organic light-emitting diode (OLED) or other types of display screens can be adopted.

If the screen includes a touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. When the device 600 is in an operation mode, such as a shooting mode or a video mode, the front camera and/or the rear camera may receive external multimedia data. Each front and rear camera may be a fixed optical lens system or have a focal length and a capability of optical zoom.

The audio component 610 is configured to output and/or input audio signals. For example, the audio component 610 includes a microphone ("MIC") configured to receive an external audio signal when the electronic device 600 is in an operation mode, such as a call mode, a recording mode and a voice recognition mode. The received audio signal may be further stored in the memory 604 or transmitted via the communication component 616. In some embodiments, the audio component 610 further includes a loudspeaker to output audio signals.

The I/O interface 612 provides an interface between the processing component 602 and peripheral interface modules, such as a keyboard, a click wheel, buttons, and the like. These buttons may include, but are not limited to, a home button, a volume button, a start button, and a lock button.

The sensor component 614 includes one or more sensors to provide status assessments of various aspects of the electronic device 600. For instance, the sensor component 614 may detect an on/off status of the electronic device 600, relative positioning of components, such as a display and a keypad of the electronic device 600, a change in position of the electronic device 600 or a component of the electronic device 600, a presence or absence of user's contact with the electronic device 600, an orientation or an acceleration/deceleration of the electronic device 600, and a change in temperature of the electronic device 600. The sensor component 614 may include a proximity sensor configured to detect presence of nearby objects without any physical contact. The sensor component 614 may also include an optical sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the electronic device 600 and other devices. The electronic device 600 can access a wireless network based on a communication standard, such as Wi-Fi, 2G, 3G, 4G, or 5G, or a combination thereof. In one exemplary embodiment, the communication component 616 receives a broadcast signal or broadcast associated information from an external broadcast management system via a broadcast channel. In one exemplary embodiment, the communication component 616 further includes a Near Field Communication (NFC) module to facilitate short-range communications. For example, the NFC module may be implemented based on a Radio Frequency IDentification (RFID) technology, an Infrared Data Association (IrDA) technology, an Ultra-WideBand (UWB) technology, a BlueTooth (BT) technology, and other technologies.

In exemplary embodiments, the electronic device 600 may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, to perform the above method.

In exemplary embodiments, there is also provided a non-transitory computer-readable storage medium including instructions, such as the memory 604 including instructions, the above instructions executable by the processor 620 in the electronic device 600 to perform the above method. For example, the non-transitory computer-readable storage medium may be a ROM, a Random Access Memory (RAM), a CD-ROM, a magnetic tape, a floppy disc, an optical data storage device, and the like.

An embodiment of the present disclosure also provides a non-transitory computer readable storage medium, when the instructions in the storage medium are executed by the processor of the electronic device, the electronic device is caused to perform the method for responding to a voice signal as shown in FIG. 3.

An embodiment of the present disclosure also provides a sound pickup decision system for responding to a voice signal. The sound pickup decision system may perform the method for responding to a voice signal described with reference to FIG. 1. In some embodiments, the sound pickup decision system may be composed of a plurality of electronic devices as shown in FIG. 4. Alternatively, the sound pickup decision system may be composed of the plurality of electronic devices as shown in FIG. 5.

In the sound pickup decision system of the embodiment of the present disclosure, by processing a voice signal acquired by a plurality of electronic devices in real time, and determining a direct sound energy of each of the electronic devices relative to the voice signal, it can perform accurate and effective sound pickup decision according to the direct sound energies, to select at least one electronic device satisfying a predetermined condition from the plurality of electronic devices. Thereby, it can make more accurate, more reasonable, and more targeted response to the user's voice, improving voice interaction experience.

The terms "first" and "second" are used for descriptive purposes only and are not to be construed as indicating or implying a relative importance or implicitly indicating the number of technical features indicated. Thus, elements referred to as "first" and "second" can include one or more of the features either explicitly or implicitly. In the description of the present disclosure, "a plurality" indicates two or more unless specifically defined otherwise.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It is to be understood that "multiple" mentioned in the present disclosure refers to two or more than two. "And/or" describes an association relationship of associated objects and represent that three relationships can exist. For example, A and/or B can represent three conditions, i.e., independent existence of A, coexistence of A and B and independent existence of B. Character "/" usually represents that previous and next associated objects form an "or" relationship.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for responding to a voice signal, applied to a plurality of electronic devices, comprising:
 receiving, by the plurality of electronic devices, a voice signal;
 determining, for each of the electronic devices, a target sound source point associated with the voice signal;
 determining, for each of the electronic devices, a direct sound energy associated with the voice signal according to the target sound source point; and
 selecting, from the plurality of electronic devices, at least one electronic device with a direct sound energy satisfying a predetermined condition, and responding, by the at least one electronic device, to the voice signal;
 wherein said determining, for each of the electronic devices, the direct sound energy associated with the voice signal according to the target sound source point comprises:
 determining, based on the target sound source point, a direct sound coefficient and a reverberation coefficient;
 establishing a direct sound model based on the direct sound coefficient, and establishing a reverberation model based on the reverberation coefficient;
 establishing a spatial covariance matrix based on the direct sound model and the reverberation model; and
 determining the direct sound energy based on the spatial covariance matrix.

2. The method for responding to a voice signal according to claim 1, wherein said determining, for each of the electronic devices, the target sound source point associated with the voice signal comprises:
 selecting, based on a geometric center of an array of sound acquisition devices comprised in each of the electronic devices, a plurality of candidate sound source points of the each of the electronic devices;
 determining a total correlation of each candidate sound source point of the each of the electronic devices relative to the voice signal; and
 determining a candidate sound source point with a largest total correlation as the target sound source point of the electronic device.

3. The method for responding to a voice signal according to claim 2, wherein said determining the total correlation of the each candidate sound source point of the each of the electronic devices relative to the voice signal comprises:
 determining, for the each candidate sound source point, a correlation between every two sound acquisition devices in the array of sound acquisition devices relative to the voice signal at the candidate sound source point; and
 calculating a sum of correlations determined for the array of sound acquisition devices, as the total correlation of the candidate sound source point.

4. The method for responding to a voice signal according to claim 3, wherein said determining, for the each candidate sound source point, the correlation between the every two sound acquisition devices in the array of sound acquisition devices relative to the voice signal at the candidate sound source point comprises:
 determining, according to positions of the every two sound acquisition devices and a position of the candidate sound source point, a delay difference between the two sound acquisition devices respectively relative to the candidate sound source point; and
 determining, according to the delay difference and a frequency domain representation of the voice signal, the correlation between the two every sound acquisition devices on the voice signal at the candidate sound source point.

5. The method for responding to a voice signal according to claim 1, wherein said determining the direct sound energy based on the spatial covariance matrix comprises:
 determining a sum of the direct sound model and the reverberation model as the spatial covariance matrix;
 determining, based on the spatial covariance matrix and a frequency domain representation of the voice signal, a direct sound power spectrum; and
 determining the direct sound energy based on the direct sound power spectrum.

6. The method for responding to a voice signal according to claim 1, wherein said selecting, from the plurality of electronic devices, at least one electronic device with the direct sound energy satisfying the predetermined condition comprises:
 selecting, from the plurality of electronic devices, at least one electronic device with a largest direct sound energy, or selecting, from the plurality of electronic devices, at least one electronic device with a direct sound energy exceeding a predetermined threshold.

7. A method for responding to a voice signal, comprising:
 receiving, by an electronic device, a voice signal;
 determining, by the electronic device, a target sound source point associated with the voice signal;
 determining, by the electronic device, a direct sound energy associated with the voice signal according to the target sound source point; and
 responding, by the electronic device, to the voice signal when the direct sound energy satisfies a predetermined condition;
 wherein said determining, by the electronic device, the direct sound energy associated with the voice signal according to the target sound source point comprises:
 determining, based on the target sound source point, a direct sound coefficient and a reverberation coefficient;
 establishing a direct sound model based on the direct sound coefficient, and establishing a reverberation model based on the reverberation coefficient;
 establishing a spatial covariance matrix based on the direct sound model and the reverberation model; and
 determining the direct sound energy based on the spatial covariance matrix.

8. An electronic device for responding to a voice signal, comprising:
 an array of sound acquisition devices configured to receive a voice signal;
 a processor; and
 a memory configured to store instructions executable by the processor;
 wherein the processor is configured to:
 cause the electronic device to determine a target sound source point associated with the voice signal;
 determine a direct sound energy associated with the voice signal according to the target sound source point; and cause the electronic device to respond to the voice signal when the direct sound energy satisfies a predetermined condition;

wherein the processor is further configured to:

determine a direct sound coefficient and a reverberation coefficient based on the target sound source point;

establish a direct sound model based on the direct sound coefficient, and establish a reverberation model based on the reverberation coefficient;

establish a spatial covariance matrix based on the direct sound model and the reverberation model; and determine the direct sound energy based on the spatial covariance matrix.

9. The electronic device for responding to a voice signal according to claim 8, wherein the electronic device is configured to determine the target sound source point associated with the voice signal based on:

selecting, based on a geometric center of an array of sound acquisition devices comprised in each of the electronic devices, a plurality of candidate sound source points of the each of the electronic devices;

determining a total correlation of each candidate sound source point of the each of the electronic devices relative to the voice signal; and determining a candidate sound source point with a largest total correlation as the target sound source point of the electronic device.

10. The electronic device for responding to a voice signal according to claim 9, wherein said determining the total correlation of the each candidate sound source point of the each of the electronic devices relative to the voice signal comprises:

determining, for the each candidate sound source point, a correlation between every two sound acquisition devices in the array of sound acquisition devices relative to the voice signal at the candidate sound source point; and calculating a sum of correlations determined for the array of sound acquisition devices, as the total correlation of the candidate sound source point.

11. The electronic device for responding to a voice signal according to claim 10, wherein said determining, for the each candidate sound source point, the correlation between the every two sound acquisition devices in the array of sound acquisition devices relative to the voice signal at the candidate sound source point comprises:

determining, according to positions of the every two sound acquisition devices and a position of the candidate sound source point, a delay difference between the two sound acquisition devices respectively relative to the candidate sound source point; and determining, according to the delay difference and a frequency domain representation of the voice signal, the correlation between the two every sound acquisition devices on the voice signal at the candidate sound source point.

12. The electronic device for responding to a voice signal according to claim 8, wherein the processor is configured to determine the direct sound energy based on the spatial covariance matrix based on:

determining a sum of the direct sound model and the reverberation model as the spatial covariance matrix;

determining, based on the spatial covariance matrix and a frequency domain representation of the voice signal, a direct sound power spectrum; and determining the direct sound energy based on the direct sound power spectrum.

13. The electronic device for responding to a voice signal according to claim 8, wherein the electronic device is selected from the plurality of electronic devices with the direct sound energy satisfying the predetermined condition comprises based on:

selecting, from the plurality of electronic devices, at least one electronic device with a largest direct sound energy, or selecting, from the plurality of electronic devices, at least one electronic device with a direct sound energy exceeding a predetermined threshold.

14. A non-transitory computer readable storage medium, wherein when instructions in the storage medium are executed by a processor of an electronic device, the electronic device is caused to execute the method for responding to a voice signal according to claim 7.

15. A system for responding to a voice signal, wherein the system comprises a plurality of electronic devices, and upon the plurality of electronic devices receive a voice signal, the system executes the method according to claim 1.

16. The system for responding to a voice signal according to claim 15, wherein the system is configured to perform targeted response to a user's voice based on sound pickup decision according to the direct sound energies.

17. The system for responding to a voice signal according to claim 16, wherein the system is a smart home system;

the sound pickup decision is further based on calculating a sum of correlations determined for the plurality of electronic devices, as a total correlation of the candidate sound source point;

the total correlation is a vector with spatial characteristics including that the closer the candidate sound source point is to the real sound source point, the larger the total correlation value will be;

the candidate point with a largest total correlation is considered as the target sound source point; and the total correlation comprises an SRP (Steered Response Power).

18. The system for responding to a voice signal according to claim 17, wherein the candidate sound source point is selected by establishing a unit spherical surface centered on a center of the plurality of electronic devices, and taking points with a number of s, s being an integer larger than 2, on the spherical surface, and calculating the total correlation to the voice signal acquired by the plurality of electronic devices is calculated.

* * * * *